United States Patent
Hamada

(10) Patent No.: US 8,896,861 B2
(45) Date of Patent: Nov. 25, 2014

(54) IMAGE READING APPARATUS

(75) Inventor: Ryoh Hamada, Osaka (JP)

(73) Assignee: Sharp Kabushiki Kaisha, Osaka-Shi, Osaka (JP)

(*) Notice: Subject to any disclaimer, the term of this patent is extended or adjusted under 35 U.S.C. 154(b) by 1280 days.

(21) Appl. No.: 12/655,436

(22) Filed: Dec. 29, 2009

(65) Prior Publication Data

US 2010/0188694 A1 Jul. 29, 2010

(30) Foreign Application Priority Data

Jan. 28, 2009 (JP) .................................. 2009-016340

(51) Int. Cl.
*G06F 3/12* (2006.01)
*H04N 1/44* (2006.01)
*H04N 1/00* (2006.01)

(52) U.S. Cl.
CPC ...... *H04N 1/4413* (2013.01); *H04N 2201/3273* (2013.01); *H04N 2201/0081* (2013.01); *H04N 2201/0094* (2013.01); *H04N 2201/3225* (2013.01); *H04N 1/444* (2013.01); *H04N 1/00222* (2013.01); *H04N 1/00225* (2013.01); *H04N 2201/3278* (2013.01); *H04N 2201/3246* (2013.01)
USPC ......... 358/1.15; 358/1.13; 358/1.16; 358/402

(58) Field of Classification Search
None
See application file for complete search history.

(56) References Cited

U.S. PATENT DOCUMENTS

| 2006/0210244 A1* | 9/2006 | Fujita et al. ..................... 386/94 |
| 2007/0121155 A1* | 5/2007 | Machiyama ................. 358/1.15 |
| 2007/0268906 A1* | 11/2007 | Shozaki et al. ............... 370/392 |

FOREIGN PATENT DOCUMENTS

| JP | 2003-087454 A | 3/2003 |
| JP | 2003-114852 A | 4/2003 |

* cited by examiner

*Primary Examiner* — King Poon
*Assistant Examiner* — Pawandeep Dhingra
(74) *Attorney, Agent, or Firm* — Edwards Wildman Palmer LLP; David G. Conlin; David J. Silvia

(57) ABSTRACT

An image reading apparatus includes: a document reading unit; a storage storing a user ID and viewing limiting information indicating whether or not viewing of image data is permitted or not, in association with each other for each user; a control unit activating the document reading unit when authentication based on the user ID is successful; and a limiting information adding unit for adding, to the image data, authentication requesting data indicating that authentication is necessary for viewing the image data, in accordance with the viewing limiting information associated with the authenticated user ID.

6 Claims, 12 Drawing Sheets

FIG. 5

| USER ID | PASSWORD | VIEWING LIMITING INFORMATION 140 ||||| 
| --- | --- | --- | --- | --- | --- | --- |
| | | PLANNING DEPT | SALES DEPT | PRODUCTION DEPT | TECHNICAL DEPT | QUALITY DEPT |
| A | ******** | ALL PAGES | 1 PAGE | 1 PAGE | ALL PAGES | ALL PAGES |
| B | ******** | ALL PAGES | X | X | X | X |
| C | ******** | X | X | X | X | ALL PAGES |
| D | ******** | X | X | ALL PAGES | X | X |
| E | ******** | X | 1 PAGE | X | X | X |
| F | ******** | X | X | X | 1 PAGE | X |

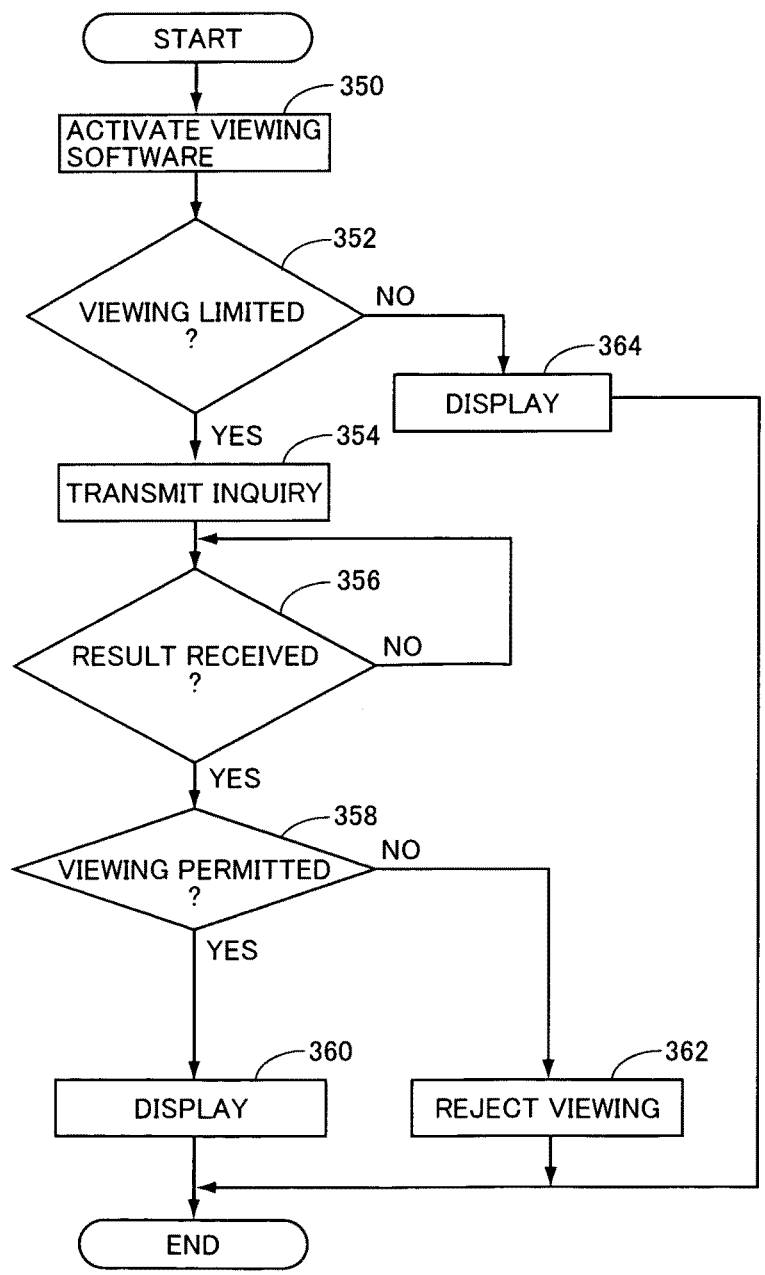

IMAGE READING APPARATUS

CROSS-REFERENCE TO RELATED APPLICATION

This nonprovisional application claims priority under 35 U.S.C. §119(a) on Patent Application No. 2009-016340 filed in Japan on Jan. 28, 2009, the entire contents of which are hereby incorporated by reference.

BACKGROUND OF THE INVENTION

1. Field of the Invention

The present invention relates to an image reading apparatus and, more specifically, to an image reading apparatus, a server and a system, for adding, when the image reading apparatus reads a document image, limiting information corresponding to the user to the image for limiting viewing of the read image.

2. Description of the Background Art

Conventionally, concerning confidential electronic data generated by a user using a computer, technique for limiting viewing of electronic data has been developed.

Japanese Patent Laying-Open No. 2003-114852 (Document 1) discloses a network system technique for limiting viewing of an electronic mail generated by a user. The network system described in Document 1 includes a server for managing states of electronic mails transmitted/received by terminals.

An electronic mail transmitted from a terminal is transmitted to a destination terminal through the server. The terminal receiving the electronic mail transmits to the server viewing information indicating whether or not the electronic mail has already been viewed by a user. The server stores and manages the viewing information from the terminals.

It is possible for the user to confirm whether or not the electronic mail he/she sent has been viewed, by accessing to the server through an operation of the terminal.

If the user has transmitted an electronic mail and thereafter comes to remember that the electronic mail contains confidential matters, it is possible to limit viewing of the electronic mail if the electronic mail has not yet been viewed.

Assume, for example, that the electronic mail contains confidential matters that should not be viewed by a user of the destination terminal. In such a situation, the user of a transmission source terminal may set to prohibit viewing of the electronic mail. Further, the user of the transmission source terminal may set a password for displaying the electronic mail, so that the user of the transmission destination terminal cannot view the electronic mail unless he/she inputs the password.

By limiting viewing of the electronic data in the above-described manner, it is possible to prevent leakage of confidential matters.

SUMMARY OF THE INVENTION

Generally, if an image reading apparatus such as a scanner is installed in a large company, it is expected that the image reading apparatus reads considerably large amount of image data. If a document image read by the image reading apparatus includes confidential matters of the company, it is desirable to limit viewing of the read image data.

According to the technique described in Document 1, it is possible for the user to limit viewing of each image data after the image data is read by the image reading apparatus, by so setting every time. If the number of read image data is huge, however, it is troublesome and impractical for the user to set viewing limitation for each and every image data. Document 1 is silent about the method of handling an enormous number of electronic mails.

Therefore, an object of the present invention is to provide an image reading apparatus, a server and a system for efficiently limiting viewing of image data without necessitating troublesome work by the user, even if an enormous number of image data must be read.

According to a first aspect, the present invention provides an image reading apparatus, including a document reading unit for reading a document image. The image reading apparatus uses a storage for storing, for each user, user information of the user in association with viewing limiting information indicating whether or not viewing of image data read by the document reading unit is limited in accordance with an instruction by the user. The image reading apparatus further includes an authentication unit receiving user information input by the user, and performing user authentication in accordance with whether or not the input user information is stored in the storage; a document reading control unit activating the document reading unit, when authentication by the authentication unit is successful; and an information adding unit responsive to reading of document image data by the document reading unit, for adding to the image data, in accordance with the viewing limiting information stored in the storage in association with the user information input to the authentication unit, authentication requesting data indicating that authentication is required to view the image data.

The document reading unit reads a document image, and the authentication unit performs user authentication in accordance with the user information input by the user. When authentication by the authentication unit is successful, the document reading control unit enables the document reading unit.

Only the user or users who have already been stored in the storage can have the image read by the image reading apparatus. Therefore, use by an unauthorized user can be prevented.

In response to the reading of document image data by the document reading unit, the information adding unit adds to the image data the authentication request data indicating that authentication is necessary to view the image data, in accordance with the viewing limiting information stored in the storage in association with the user information input through the authentication unit.

Some applications for displaying image data do not immediately display image data if the image data has data such as authentication request data added thereto. Therefore, if the image data contains confidential matters and a third party tries to display it, display of the image data can be prevented if it has the authentication request data added thereto. Even if the number of data to be read by the document reading unit is enormous, it is unnecessary for the user to limit viewing of image data one by one. If the user should inadvertently transmit a confidential read image to a different apparatus, immediate viewing of the image data can be prevented. As a result, an image reading apparatus that can efficiently limit viewing of image data can be provided, even if there is a formidable amount of image data to be read, without necessitating troublesome work by the user.

Preferably, the image reading apparatus is connected to a communication apparatus through a network. The image reading apparatus further includes a data transmitting unit transmitting the image data having the authentication requesting data added by the information adding unit, to the communication apparatus through the network.

The data communication unit transmits the image data to which the authentication request data has been added by the information adding unit, through the network to the communication apparatus. The image data transmitted to the communication apparatus has the authentication request data added thereto. Therefore, even if a user of the image reading apparatus inadvertently transmits the read image to another apparatus forgetting that the image contains confidential matters, immediate viewing of the image data by a user of the communication apparatus can be prevented.

More preferably, the image reading apparatus further includes: a receiving unit receiving a viewing request requesting viewing of the image data transmitted by the data transmitting unit, from the communication apparatus through the network; and a permission signal transmitting unit, responsive to reception of the viewing request by the receiving unit, for transmitting a viewing permission signal indicating whether viewing is permitted or not, to the communication apparatus as a source of transmission of the viewing request, through the network.

The receiving unit receives the viewing request requesting viewing of image data transmitted by the data transmitting unit, from the communication apparatus through the network. In response to the receiving unit receiving the viewing request, the permission signal transmitting unit transmits the viewing permission signal indicating whether or not viewing is permitted, in accordance with the viewing request, to the communication apparatus as the transmission source of the viewing request, through the network. If viewing is permitted by the viewing permission signal, the user of the communication apparatus can view the image data.

More preferably, the viewing limiting information stored in the storage includes group limiting information indicating whether or not viewing of image data read by the document reading unit is limited in accordance with an instruction by the user, for each of a plurality of groups. The data transmitting unit further adds the user information input to the authentication unit to the image data and transmits the image data to the communication apparatus through the network. The viewing request received by the receiving unit includes any of the groups and user information. The permission signal transmitting unit transmits, responsive to reception of the viewing request by the receiving unit, a signal permitting viewing of the image data to the communication apparatus as the source of transmission of the viewing request through the network, in accordance with the group limiting information stored in the storage in association with the group and user information included in the viewing request.

Therefore, it is possible to limit, group by group, viewing of image data read by the document reading unit.

More preferably, the document reading unit is capable of reading images of a plurality of document pages. The group limiting information stored in the storage indicates a range of pages of the image data viewable by the group.

Therefore, it is possible to limit, group by group, the range of pages that can be viewed.

More preferably, the data communication unit includes an encrypting unit encrypting image data having the authentication requesting data added by the information adding unit, and an encrypted data transmitting unit transmitting the image data encrypted by the encrypting unit to the communication apparatus through the network.

The encrypting unit encrypts the image data having the authentication request data added thereto, and the encrypted data transmitting unit transmits the encrypted image data to the communication apparatus through the network. Therefore, even if the image data should be leaked to a malicious third party, it is difficult for the third party to know the contents of the image data, and improved security can be attained.

More preferably, the image reading apparatus is connected to an image forming apparatus through a network. The image reading apparatus further includes a data transmitting unit transmitting the image data having the authentication requesting data added by the information adding unit, to the image forming apparatus through the network.

The data transmitting unit transmits the image data having the authentication request data added thereto, to the image forming apparatus. The image data transmitted to the image forming apparatus has the authentication request data added thereto. Therefore, even if a user of the image reading apparatus inadvertently transmits the read image to the image forming apparatus forgetting that the image contains confidential matters, immediate viewing of the image data by a user of the image forming apparatus can be prevented.

According to a second aspect, the present invention provides a server, connected through a network to the image reading apparatus and the communication apparatus described above. The server includes a storage; a receiving unit receiving a viewing request requesting viewing of image data transmitted by the data transmitting unit from the communication apparatus through the network; and a permission signal transmitting unit, responsive to reception of the viewing request by the receiving unit, for transmitting a viewing permission signal indicating whether viewing is permitted or not, in accordance with the viewing request, to the communication apparatus as the source of transmission of the viewing request, through the network.

The receiving unit of the server receives the viewing request requesting viewing of image data transmitted by the data transmitting unit from the communication apparatus through the network. In response to the receiving unit receiving the viewing request, the permission signal transmitting unit transmits the viewing permission signal indicating whether or not viewing is permitted, in accordance with the viewing request, to the communication apparatus as the transmission source of the viewing request, through the network. If viewing is permitted by the viewing permission signal, the user of the communication apparatus can view the image data.

According to a third aspect, the present invention provides a system including a plurality of image reading apparatuses, a sever and a communication apparatus, connected through a network. Each of the plurality of image reading apparatuses includes a document reading unit for reading a document image. The system uses a storage for storing, for each user, user information of the user in association with viewing limiting information indicating whether or not viewing of image data read by the document reading unit of the plurality of document reading apparatuses is limited in accordance with an instruction by the user. Each of the plurality of image reading apparatuses further includes an authentication unit receiving user information input by the user, and performing user authentication in accordance with whether or not the input user information is stored in the storage, a document reading control unit enabling the document reading unit, when authentication by the authentication unit is successful, an information adding unit responsive to reading of document image data by the document reading unit, for adding to the image data, in accordance with the viewing limiting information stored in the storage in association with the user information input to the authentication unit, authentication requesting data indicating that authentication is required to view the image data, and a data transmitting unit transmitting the image data having the authentication requesting data added by the information adding unit, to the communication apparatus through the network. The server includes a receiving unit receiving a viewing request requesting viewing of image data transmitted by the data transmitting unit from the communication apparatus through the network, and a permission signal transmitting unit, responsive to reception of the viewing request by the receiving unit, for transmitting a viewing permission signal indicating whether viewing is permitted or not, in accordance with the viewing request, to the communication apparatus as the source of transmission of the viewing request, through the network. The communication apparatus includes a receiving unit receiving image data transmitted by the data transmitting unit, from the plurality of image reading apparatuses through the network, a request transmitting unit responsive to a user instruction, for transmitting the viewing request to the sever through the network, without executing a process of displaying the image data when an authentication requesting data is added to the image data received by the receiving unit, and a display unit, responsive to reception of a viewing permission signal to the viewing request, from the server through the network, for displaying the image data received by the receiving unit, in accordance with the viewing permission signal.

Preferably, the display unit further prints the image data received by the receiving unit on a sheet of paper, in accordance with the viewing permission signal.

More preferably, the plurality of image reading apparatuses, the server and the communication apparatus are connected through a virtual private network formed on the Internet.

Even when the communication apparatus and the image reading apparatus and the like are connected on the Internet, safe transmission/reception of image data is possible without necessitating separate security setting by the user, as these are connected through a virtual private network.

As described above, by the image reading apparatus in accordance with the present invention, only the user or users whose user information has already been stored can have the image read by the image reading apparatus. Therefore, use by an unauthorized user can be prevented.

The image reading apparatus in accordance with the present invention adds, when a document image data is read, authentication request data indicating necessity of authentication to view the image data, to the image data.

Some applications for displaying image data do not immediately display image data if the image data has data such as authentication request data added thereto. Therefore, if the image data contains confidential matters and a third party tries to display it, display of the image data can be prevented if it has the authentication request data added thereto. Even if the number of data to be read by the image reading apparatus is enormous, it is unnecessary for the user to limit viewing of image data one by one. If the user should inadvertently transmit a confidential read image to a different apparatus, immediate viewing of the image data can be prevented. As a result, an image reading apparatus, a server and a system that can efficiently limit viewing of image data can be provided, even if there is a formidable amount of image data to be read.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 shows a configuration of a user information table 140 shown in FIG. 4.

FIG. 12 is a flowchart representing a control structure of a computer program realizing the function of a view process executing unit 306 shown in FIG. 10.

DESCRIPTION OF THE PREFERRED EMBODIMENTS

Figure 1:
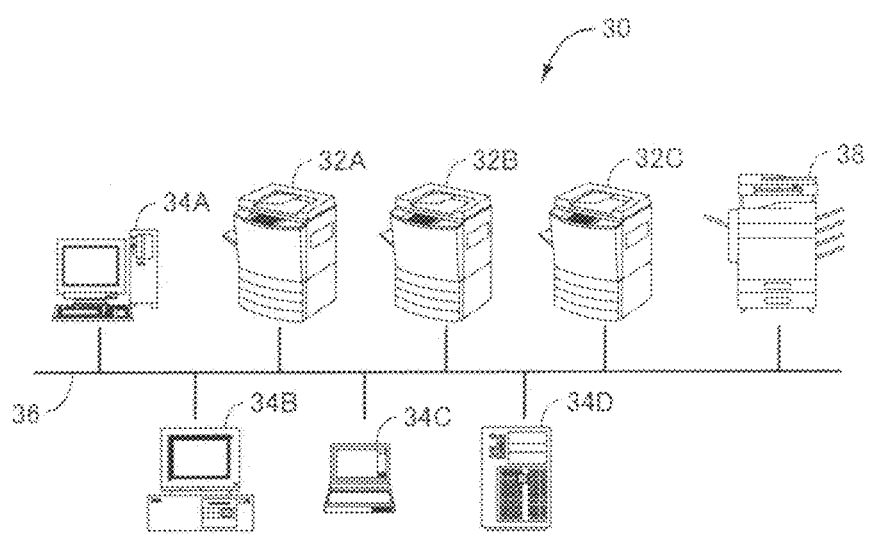
FIG. 1 is a schematic diagram showing an overall configuration of a network system 30 including an image reading apparatus 32 in accordance with a first embodiment of the present invention.

In the following embodiments, the same components are denoted by the same reference characters. Their functions and names are also the same. Therefore, detailed description thereof will not be repeated.

First Embodiment (Network Environment)

FIG. 1 is a schematic diagram showing an overall configuration of a network system 30 including an image reading apparatus 32A in accordance with an embodiment of the present invention. Referring to FIG. 1, network system 30 is connected to an LAN (Local Area Network) 36, and the system includes: image reading apparatuses 32A to 32C functioning as scanners; an image forming apparatus 38, which is an electronic photograph type MFP functioning as a facsimile, copying machine and printer connected to image reading apparatus 32A or the like through LAN 36; and terminals 34A to 34D implemented, for example, by a PC (Personal Computer) connected to image reading apparatus 32A, image forming apparatus 38 and the like through LAN 36.

In the following, image reading apparatuses 32A to 32C may be simply referred to as an image reading apparatus 32 and, terminal 34A to 34D may be simply referred to as a terminal 34.

In the present embodiment, image reading apparatus 32 attaches a read image to an electronic mail, and transmits the electronic mail to terminal 34 or image forming apparatus 38 in accordance with a user instruction.

Terminal 34 and image forming apparatus 38 receive the electronic mail from image reading apparatus 32, and thereby function as communication apparatuses for transmitting/receiving data to/from image reading apparatus 32.

(Configuration of Terminal 34)

Figure 2:
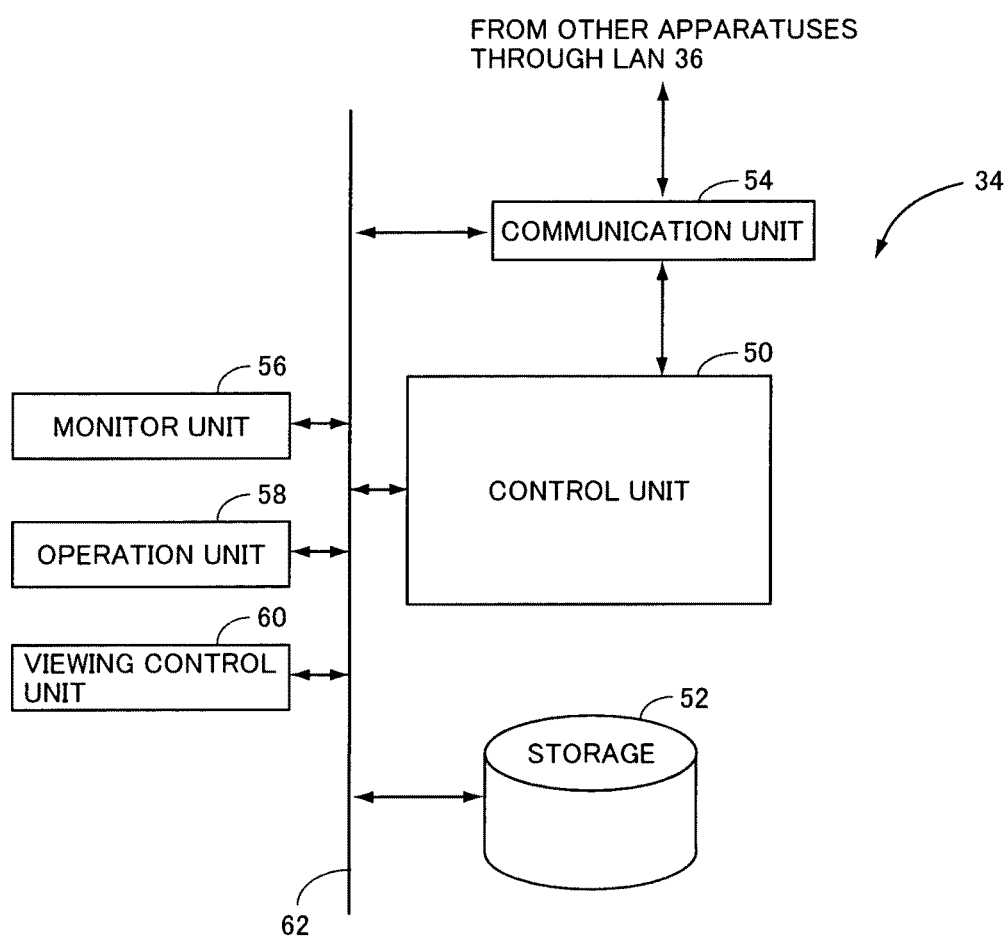
FIG. 2 is a block diagram showing a hardware configuration of a terminal 34 shown in FIG. 1.

FIG. 2 is a block diagram showing an internal configuration of terminal 34. Referring to FIG. 2, terminal 34 includes: a monitor unit 56 such as a display; an operation unit 58 such as a mouse and a keyboard operated by a user; a communication unit 54 connected to LAN 36 for transmitting/receiving data to/from other apparatuses through LAN 36; a storage 52 for storing various pieces of information including programs; and a viewing control unit 60 for permitting or prohibiting, for each user, viewing of an image transmitted from image reading apparatus 32 by the user.

Terminal 34 further includes: a bus 62 connected to monitor unit 56, operation unit 58, communication unit 54, storage 52 and viewing control unit 60; and a control unit 50 operating various units of terminal 34 and realizing various functions by executing programs.

Control unit 50 is for overall control of terminal 34, and it is implemented, for example, by a CPU (Central Processing Unit). Monitor unit 56, operation unit 58, communication unit 54, storage 52 and viewing control unit 60 are controlled by control unit 50.

(Configuration of Image Forming Apparatus 38)

Figure 3:
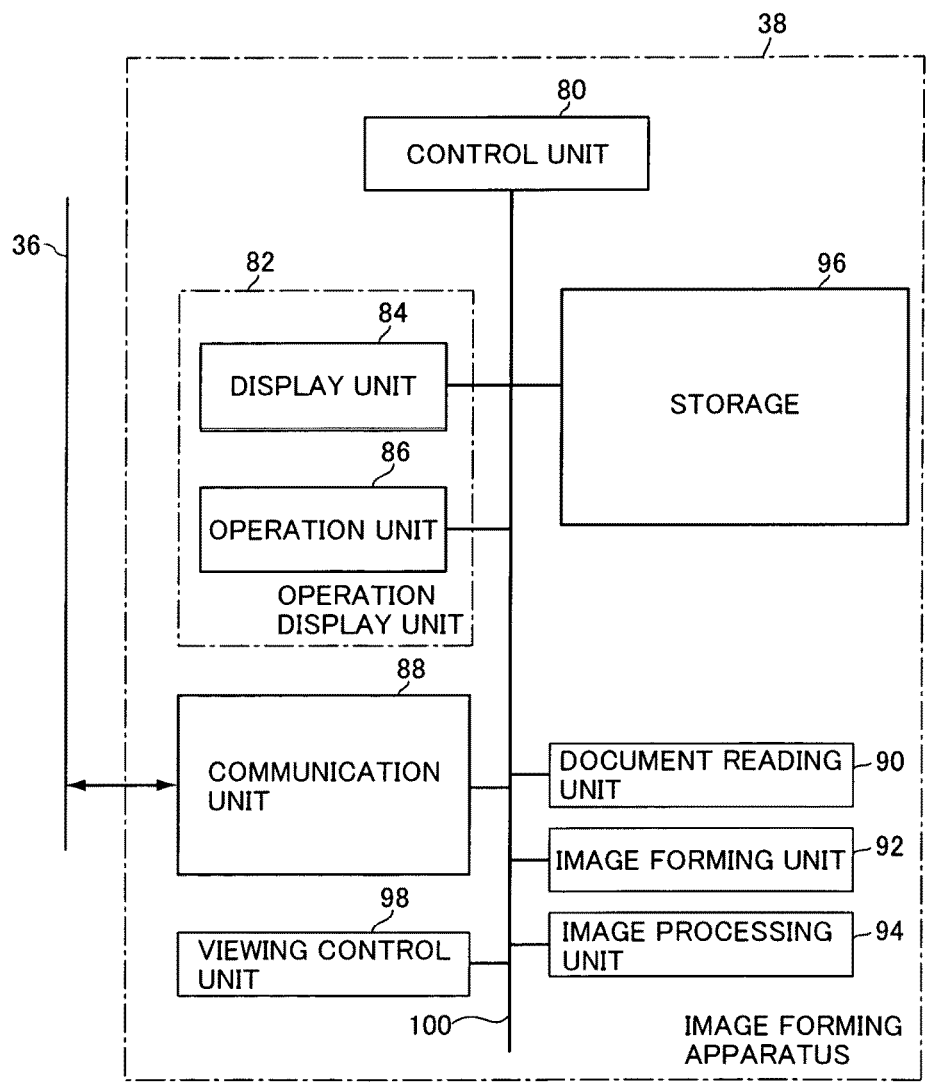
FIG. 3 is a block diagram showing a hardware configuration of an image forming apparatus 38 shown in FIG. 1.

FIG. 3 is a block diagram showing an internal configuration of image forming apparatus 38.

Referring to FIG. 3, image forming apparatus 38 includes: a document reading unit 90 for reading a document image and outputting RGB (R: Red, G: Green, B: Blue) analog image signals; and an image processing unit 94 for digitally processing and converting the RGB analog image signals output from document reading unit 90 to CMYK (C: Cyan, M: Magenta, Y; Yellow, K: Black) digital signals and outputting these signals. Image forming apparatus 38 further includes: an image forming unit 92 for forming the CMYK image output by image processing unit 94 on a sheet of recording paper; and an operation display unit 82 as an operation panel consisting of a display unit 84 and an operation unit 86 used by the user for operating image forming apparatus 38.

Image forming apparatus 38 further includes: a communication unit 88 for communication with other apparatuses through LAN 36; a storage 96 for storing various pieces of information; and a viewing control unit 98 for permitting or prohibiting, user by user, viewing by the user of the image transmitted from image reading apparatus 32. Image forming apparatus 38 further includes a bus 100 connected to document reading unit 90, image processing unit 94, image forming unit 92, operation display unit 82, communication unit 88, storage 96 and viewing control unit 98. Image forming apparatus 38 further includes a control unit 80, connected to bus 100, for realizing general functions of the image forming apparatus.

Control unit 80 is for overall control of image forming apparatus 38, and it is implemented, for example, by a CPU. Document reading unit 90, image processing unit 94, image forming unit 92, operation display unit 82, communication unit 88, storage 96 and viewing control unit 98 are controlled by control unit 80.

(Configuration of Image Reading Unit 32)

Figure 4:
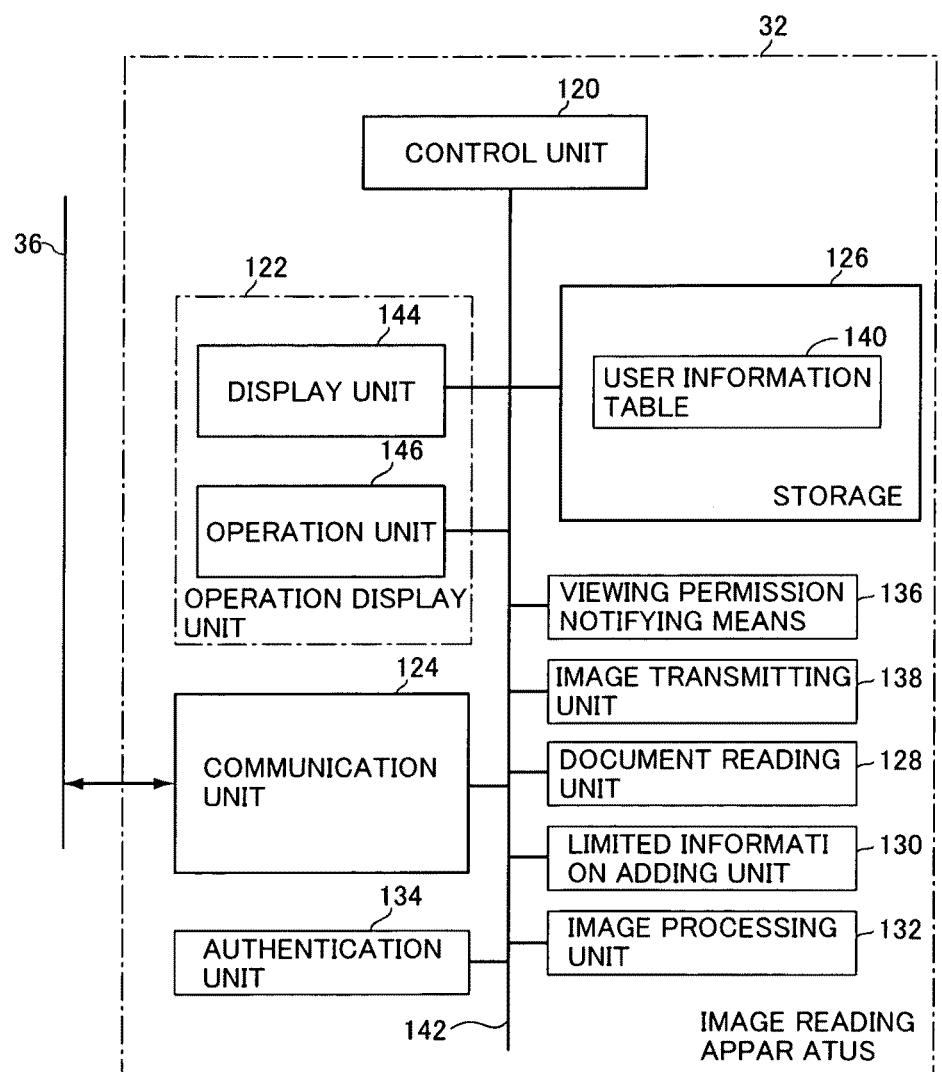
FIG. 4 is a block diagram showing a hardware configuration of image reading apparatus 32 shown in FIG. 1.

FIG. 4 is a block diagram showing an internal configuration of image reading unit 32.

Referring to FIG. 4, image reading unit 32 includes: a document reading unit 128 for reading a document image and outputting RGB analog image signals; and an image processing unit 132 for digitally processing and converting the RGB analog image signals output from document reading unit 182 to CMYK digital signals and outputting these signals. Image reading apparatus 32 further includes an operation display unit 122 as an operation panel consisting of a display unit 144 and an operation unit 146 used by the user for operating image reading apparatus 32.

Image reading apparatus 32 further includes: a communication unit 124 for communicating with other apparatuses through LAN 36; a storage 126 for storing various pieces of information; and an authentication unit 134 for performing a password authentication process when the user starts using image reading apparatus 32. Image reading apparatus 32 further includes: a limiting information adding unit 130 for adding information for limiting viewing, user by user, to the image output to image processing unit 132; an image transmitting unit 138 for transmitting an image having the information added by limiting information adding unit 130 to terminal 34 and image forming apparatus 38; and a viewing permission notifying unit 136 for returning, upon reception of a viewing request requesting permission of viewing the image output from image processing unit 132, from terminal 34 and image forming apparatus 38, a signal permitting or not permitting viewing.

Image reading apparatus 32 further includes: a bus 142 connected to document reading unit 128, image processing unit 132, operation display unit 122, communication unit 124, storage 126, authentication unit 134, limiting information adding unit 130, image transmitting unit 138, and viewing permission notifying unit 136; and a control unit 120 connected to bus 142, for realizing general functions of a scanner.

Control unit 120 is for overall control of image reading unit 32, and it is implemented, for example, by a CPU. Document reading unit 128, image processing unit 132, operation display unit 122, communication unit 124, storage 126, authentication unit 134, limiting information adding unit 130, image transmitting unit 138, and viewing permission notifying unit 136 are controlled by control unit 120.

Storage 126 includes a user information table 140 for storing information of each user of image reading apparatus 32.

FIG. 5 shows a configuration of user information table 140. Referring to FIG. 5, user information table 140 includes, for each user, a user ID of the user, a password determined in advance by the user, and information for limiting viewing of an image (hereinafter referred to as viewing limiting information) read in accordance with an instruction by the user.

In the present embodiment, it is assumed that users of image reading apparatuses 32A to 32D are classified to a plurality of groups in advance, and the plurality of groups include a planning department, a sales department, a production department, a technical department and a quality department.

In the present embodiment, the viewing limiting information represents information for prohibiting or permitting viewing of an image read in accordance with a user instruction, for each group.

As the viewing limiting information, portions that can be viewed of the read image are stored group by group. Specifically, as the viewing limiting information, "all pages", "X" and "1 page" are stored group by group. When the viewing limiting information of "all pages" is stored for the group corresponding to a certain user record, it means that any person belonging to the group can view all of the images read by the user. When the viewing limiting information of "X" is stored for the group corresponding to a certain user record, it means that a person belonging to the group cannot view the images read by the user. When the viewing limiting information of "1 page" is stored for the group corresponding to a certain user record, it means that a person belonging to the group can view only the first page of the images read by the user.

The viewing limiting information can be determined beforehand at the discretion of each user.

In the present embodiment, it is assumed that user information tables 140 of image reading apparatuses 32A to 32D each store information of different users.

(Software Configuration)

Figure 6:
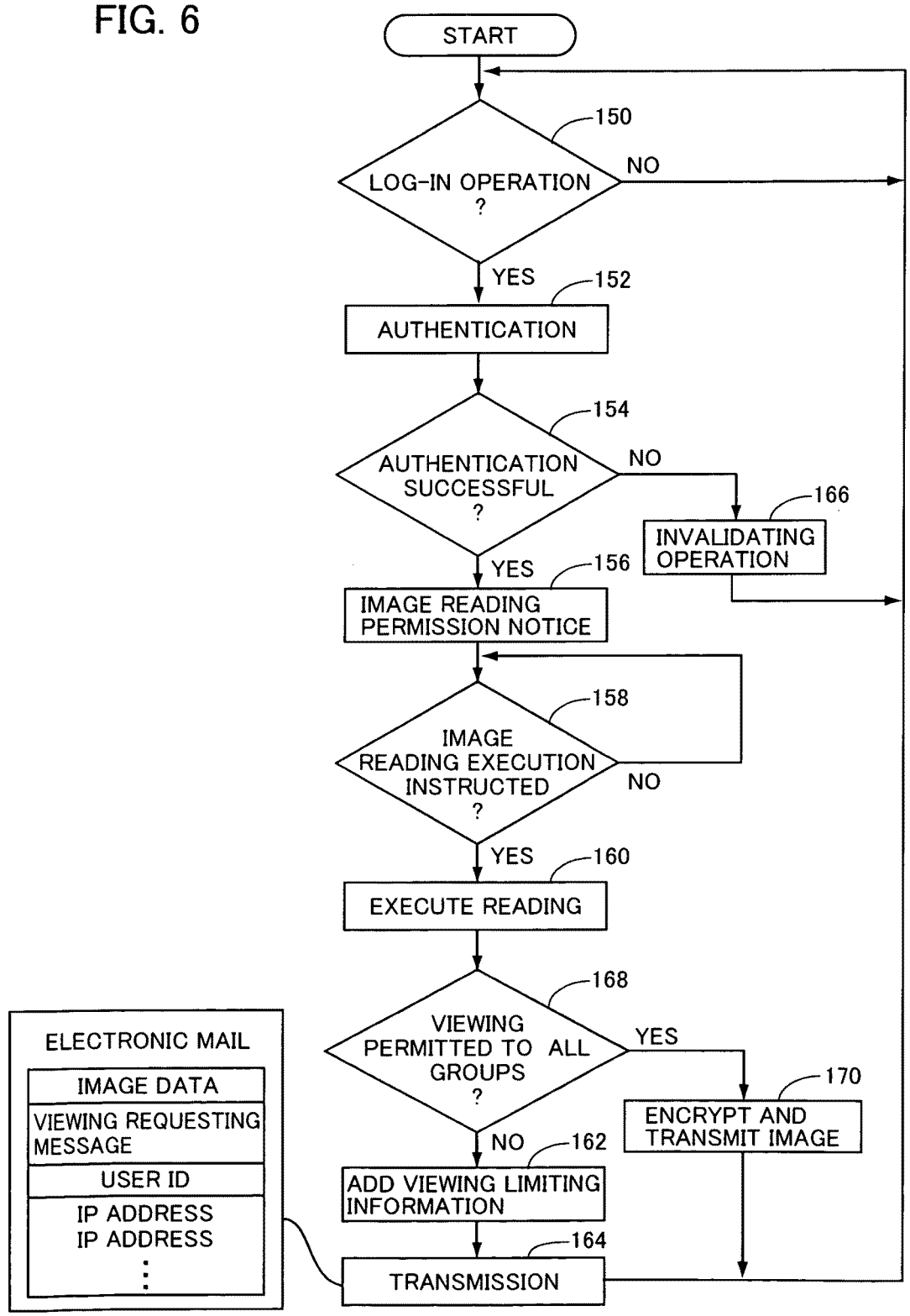
FIG. 6 is a flowchart representing a control structure of a computer program realizing the function of a control unit 120 shown in FIG. 4.
Figure 7:
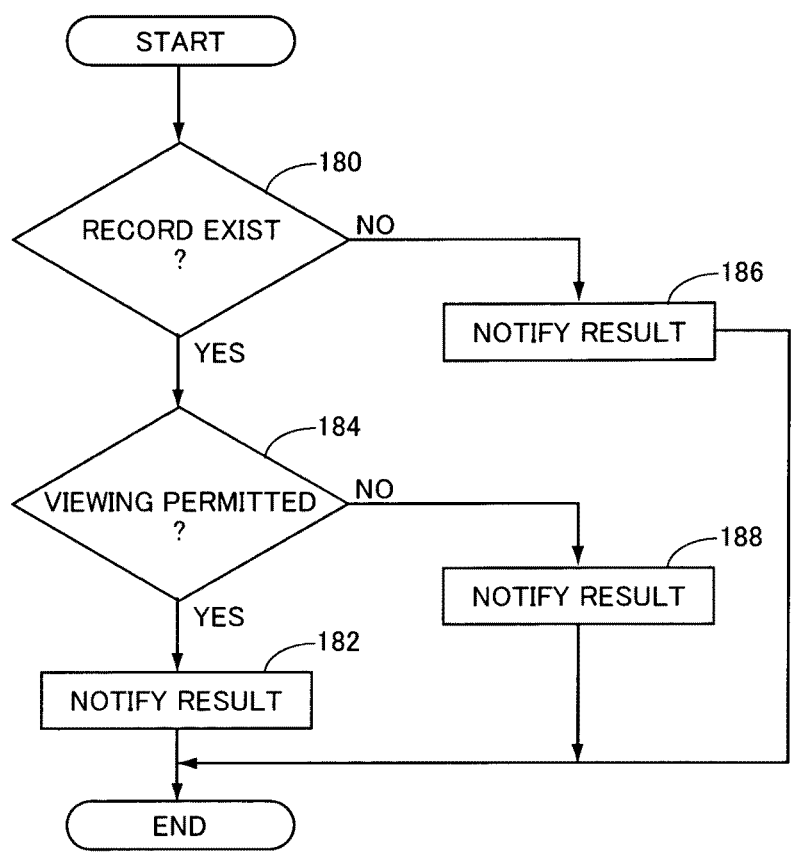
FIG. 7 is a flowchart representing a control structure of a computer program realizing the function of a viewing permission notifying unit 136 shown in FIG. 4.

FIGS. 6 and 7 are flowcharts representing control structures of a program executed by image reading apparatus 32.

FIG. 6 is a flowchart of a program executed by control unit 120 when image reading apparatus 32 is activated. Referring to FIG. 6, the program includes a step 150 of displaying, on operation display unit 122, an input window asking the user to input a user ID, a password and a mail address, and waiting until the user inputs such pieces of information to log-in.

The mail address input at step 150 is assumed to be a mail address of either terminal 34 or image forming apparatus 38.

The program further includes: a step 152, following the log-in operation by the user at step 150, of authenticating whether or not a record corresponding to the input user ID and the password exists in user information table 140; and a step 154, following step 152, of determining whether or not the authentication at step 152 has been successful, and branching the control flow depending on the result of determination.

The program further includes: a step 166 executed if the authentication of step 154 is determined to be unsuccessful, of displaying a log-in operation failure indication on operation display unit 122 and returning the control to step 166; and a step 156 executed if the authentication at step 154 is determined to be successful, of permitting reading of an image and displaying a message urging setting of a document on document reading unit 128 on operation display unit 122.

After confirming the message displayed at step 156, the user sets the document on document reading unit 128 of image reading apparatus 32. Here, the user may set a plurality of documents.

The program further includes: a step 158, following step 156, of waiting until an operation instructing document reading is made by the user; a step 160, executed if the operation instructing document reading is made by the user at step 158, of causing document reading unit 128 to read images of all documents set by the user; and a step 168, following step 160, of referring to a record of the user who is currently logged-in on user information table 140, determining whether or not "all pages" is stored in the viewing limiting information of all groups, and branching the control flow depending on the result of determination.

The program further includes: a step 170, executed if "all pages" is stored in the viewing limiting information of all groups at step 168, of encrypting the read image, attaching the encrypted image data to an electronic mail and transmitting the mail to the mail address input at step 150 as the destination, and returning the control to step 150; and a step 162, executed if "all pages" is not stored in the viewing limiting information of all groups at step 168, of adding, to the read image, a message that viewing of the image requires authentication process (hereinafter referred to as the authentication requesting message), a user ID of the user who is currently logged-in, and IP (Internet Protocol) addresses of image reading apparatuses 32A to 32D, and encrypting the added data.

The authentication requesting message at step 162 is, for example, data indicating that the authentication process is necessary to view the image, specifically represented by a character sequence of "viewing limited" or "authentication required."

The program further includes a step 164, following step 162, of attaching the data encrypted at step 162 to an electronic mail, transmitting the mail to the mail address input at the time of log-in, and returning the control to step 150.

Figure 9:
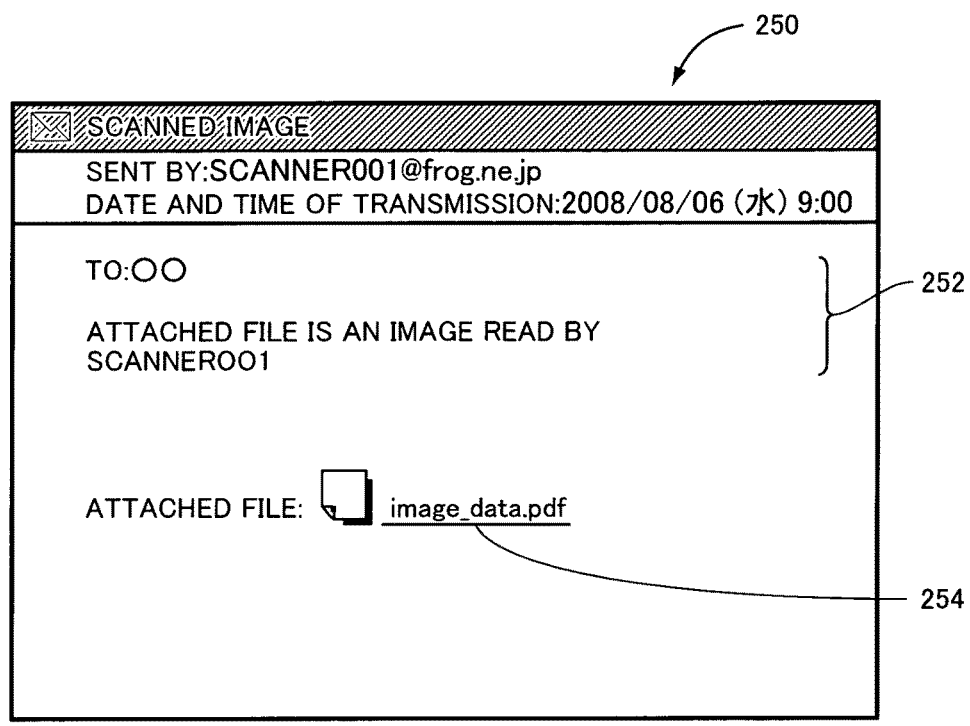
FIG. 9 shows an example of an electronic mail transmitted to terminal 34 or image forming apparatus 38 at step 164 shown in FIG. 6.

FIG. 9 is an exemplary image showing contents of the electronic mail transmitted to terminal 34 or image forming apparatus 38 at step 164. Referring to FIG. 9, an image 250 of the electronic mail includes a sentence 252 indicating from which image reading apparatus the electronic mail has been transmitted, and a link 254 to be operated to display the image attached to the electronic mail.

When the user clicks link 254, terminal 34 and image forming apparatus 38 transmit a request signal asking whether the user is permitted to view the image or not (hereinafter referred to as viewing request) depending on whether the authentication requesting message is attached to the image data or not, to image reading apparatus 32. The viewing request includes the name of the group to which the user belongs, and the user ID added to the image attached to the electronic mail.

FIG. 7 is a flowchart representing a control structure of a program controlling viewing permission notifying unit 136, executed by control unit 120, when a viewing request from either one of terminal 34 and image forming apparatus 38 is received by image reading apparatus 32. Referring to FIG. 7, the program includes: a step 180 of determining whether or not a record matching the user ID included in the viewing request exists in user information table 140, and branching the control flow depending on the result of determination; and a step 186, executed if the record does not exist at step 180, of returning a character sequence of "no record" indicating absence of the record corresponding to the user ID, to the apparatus as the source of transmission of the viewing request.

The program includes: a step 184, executed if the record exists at step 180, of referring to the record, determining whether the viewing limiting information of the group name included in the viewing request is "all pages" or "1 page", and branching the control flow depending on the result of determination; a step 188, executed if the viewing limiting information of the group name included in the viewing request is not "all pages" or "1 page", returning the character sequence of "viewing not permitted" to the source of transmission of the viewing request, and ending the program; and a step 182, executed if the viewing limiting information of the group name included in the viewing request is "all pages" or "1 page", returning the message directly to the source of transmission of the viewing request, and ending the program.

In the following, the message transmitted at step 182 will be generally referred to as the viewing permission signal.

Figure 8:
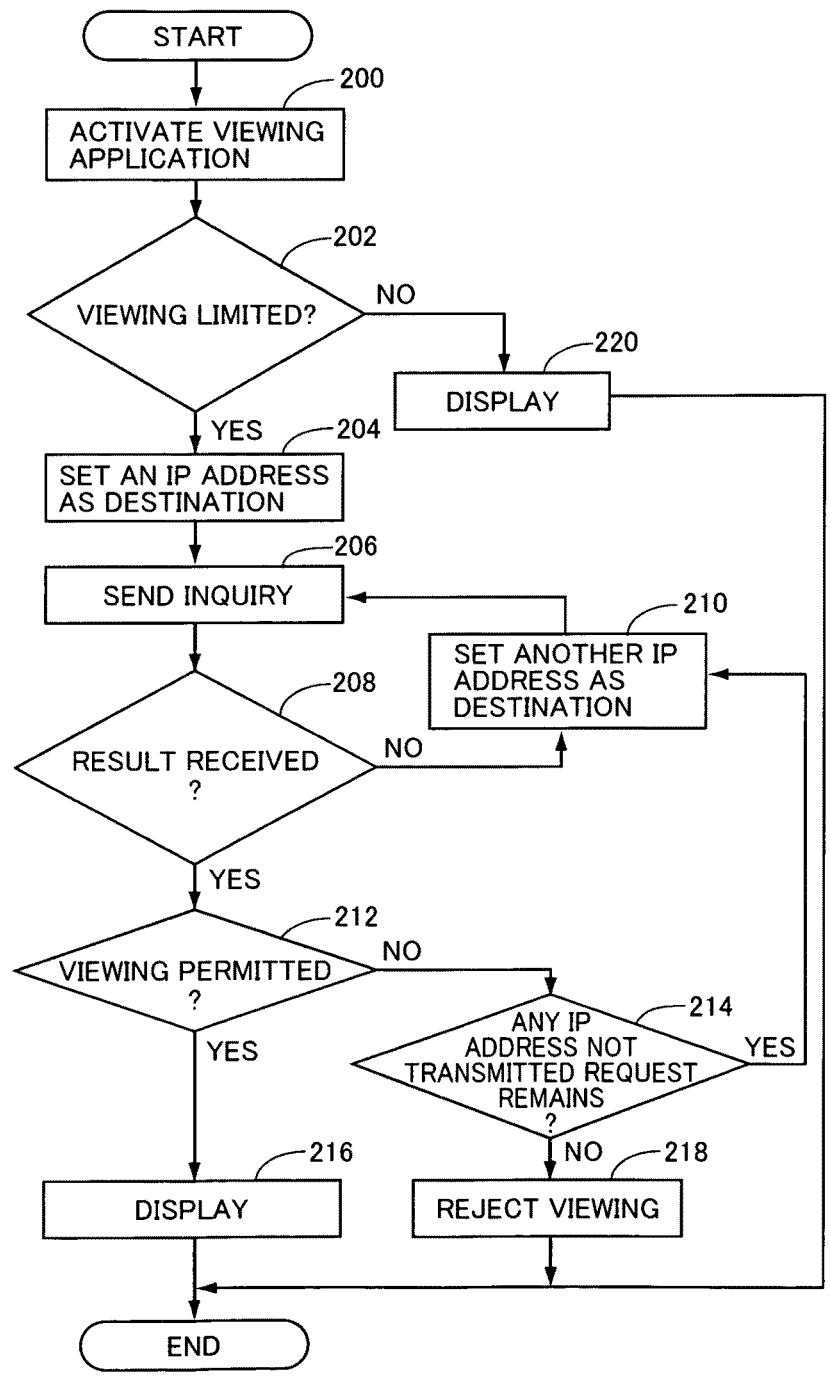
FIG. 8 is a flowchart representing a control structure of a computer program realizing the function of a view control unit 60 shown in FIG. 2.

FIG. 8 is a flowchart representing a control structure of a program controlling viewing control unit 60 executed by control unit 50 of terminal 34, when image 250 of FIG. 9 is displayed on terminal 34 and link 254 is clicked by the user. Immediately before activation of the program, the user has input the group name to which he/she belongs to terminal 34. Referring to FIG. 8, the program includes a step 200 of activating an application for displaying an image.

At step 200, the application for displaying the image is, assuming that the image is a PDF (Portable Document Format) file, an application for displaying the PDF file on monitor unit 56. In the present embodiment, the image data is not limited to the PDF file, and it may be of any format.

The program further includes: a step 202, following step 200, of determining whether or not the authentication requesting message is added to the image data, and branching the control flow depending on the result of determination; a step 220, executed if the authentication requesting message is not added to the image data at step 202, of immediately displaying the image data and ending the program; and a step 204, executed if the authentication requesting message is added to the image data at step 202, of setting as the destination, the IP address added to the image data.

The program further includes a step 206, following step 204, of transmitting, to the IP address currently set as the destination, a viewing request including the name of the group of the user using terminal 34 at present and the user ID added to the image data; and a step 208, following step 206, of determining whether or not a result of inquiry in response to the viewing request has been received within a predetermined time period (for example, within 1 minute), and branching the control flow depending on the result of determination.

The result of inquiry at step 208 means the message transmitted at step 182, 186 or 188 shown in FIG. 7.

The program further includes: a step 210, executed if the result of inquiry is not received within the predetermined time period at step 208, of setting, as a new destination, an IP address that has not yet transmitted the viewing request, among the IP addresses added to the image data, and returning the control to step 206; and a step 212, executed if the result of inquiry is received within the predetermined time period at step 208, of determining whether or not the result is the viewing permission signal, and branching the control flow depending on the result of determination.

The program further includes: a step 216, executed if the result of inquiry is the viewing permission signal at step 212, of displaying the page in accordance with the signal, and ending the program; a step 214, executed if the result of inquiry at step 212 is not the viewing permission signal, of determining whether or not there is an IP address that has not yet transmitted the viewing request among the IP addresses added to the image data, and branching the control flow depending on the result of determination; and a step 218, executed if there is no IP address that has not yet transmitted the viewing request at step 214, of presenting a message that display of the image data is rejected, to the user, and ending the program.

If there is an IP address that has not yet transmitted the viewing request at step 214, the control returns to step 210.

The program executed by control unit 80 of image forming apparatus 38 for controlling viewing control unit 98 when image 250 shown in FIG. 9 is displayed on image forming apparatus 38 and link 254 is clicked by the user is substantially the same as the program shown in FIG. 8, except that in accordance with a user instruction, it is possible to print the image displayed at step 216 or 220.

(Operation)

Referring to FIGS. 1 to 9, network system 90 including image reading apparatus 32 in accordance with the present embodiment having the above-described structure operates in the following manner. It is assumed that the data shown in FIG. 5 is stored in advance in user information table 140 of image reading apparatuses 32A to 32D.

When activated, image reading apparatus 32 waits until the user makes a log-in operation (step 150 shown in FIG. 6).

Assume that the user executes the log-in operation by inputting the user ID, password and mail address to image reading apparatus 32. Then, the result of determination at step 150 shown in FIG. 6 is YES.

Image reading apparatus 32 performs the authentication process in accordance with the input user ID and the password (step 152 shown in FIG. 6). If the authentication fails, image reading apparatus 32 displays failure of log-in operation on operation display unit 122 (step 166 shown in FIG. 6).

If the authentication is successful, image reading apparatus 32 permits reading of the image, and displays a message urging setting of a document on document reading unit 128, on operation display unit 122 (step 156 shown in FIG. 6).

The user sets a document containing one or a plurality of pages on document reading unit 128 of image reading apparatus 32, and performs an operation instructing document reading, to image reading apparatus 32. Then, the result of determination at step 158 shown in FIG. 6 is YES.

When image reading is instructed by the user, image reading apparatus 32 reads the document image (step 160 shown in FIG. 6). Image reading apparatus 32 determines whether or not the viewing limiting information of all groups is "all pages," in the record of the user who is currently logged-in, of user information table 140 (step 168 shown in FIG. 6).

In the following, operation of two different situations, that is, if the viewing limiting information of any of the groups is not "all pages," and if the viewing limiting information of all groups is "all pages," in the record of the user who is currently logged-in, of user information table 140, will be described.

<If the Viewing Limiting Information of any of the Groups is not "All Pages">

If the viewing limiting information of any of the groups in the record of the corresponding user is not "all pages," image reading apparatus 32 adds the authentication requesting message, the user ID of the currently logged-in user, and IP addresses of all image reading apparatuses 32 to the read image data, and encrypts the image data (step 162 shown in FIG. 6). Image reading apparatus 32 attaches the encrypted data to an electronic mail, and transmits the electronic mail to the mail address input at the time of log-in as a destination (step 164 shown in FIG. 6).

Assume that the electronic mail transmitted at step 164 is received by terminal 34. Further, assume that a user performs an operation of 25, displaying image 250 of the electronic mail on terminal 34, inputs his/her group and clicks link 254.

In response to the operation, terminal 34 activates an application for displaying the image data attached to the electronic mail (step 200 shown in FIG. 8), and determines whether or not the electronic mail has the authentication requesting message added thereto (step 202 shown in FIG. 8).

If the authentication requesting message is not added to the image data at step 202, terminal 34 immediately displays the image data to the user (step 220 shown in FIG. 8).

If the authentication requesting message has been added to image data at step 202, terminal 34 performs the following process.

Terminal 34 sets the IP address added to the image data as the destination (step 204 shown in FIG. 8), and transmits a viewing request including the group name of the user currently using terminal 34 and the user ID added to the image data (step 206 shown in FIG. 8).

Receiving the viewing request, an image reading apparatus 32 returns "all pages," "viewing not permitted" or the viewing permission signal, as the result of inquiry, to terminal 34 as the source of transmission of the viewing request.

If there is no record matching the user ID included in the viewing request in user information table 140 (NO at step 180 shown in FIG. 7), image reading apparatus 32 returns "no record" as the result of inquiry.

If there is a record matching the user ID included in the viewing request in user information table 140 (YES at step 180 shown in FIG. 7) and the viewing limiting information of the group included in the viewing request is "all pages" or "1 page" in the record (YES at step 184 shown in FIG. 7), image reading apparatus 32 returns such viewing limiting information directly as the result of inquiry.

If there is a record matching the user ID included in the viewing request in user information table 140 (YES at step 180 shown in FIG. 7) and the viewing limiting information of the group included in the viewing request is neither "all pages" nor "1 page" in the record (NO at step 184 shown in FIG. 7), image reading apparatus 32 returns "viewing not permitted" as the result of inquiry.

If the result of inquiry is not received within the predetermined time period from image reading apparatus 32 (NO at step 208 shown in FIG. 8), terminal 34 sets an IP address that has not yet transmitted the viewing request among the IP addresses added to the image data as the destination, and returns the control to step 206.

If the result of inquiry is received within the predetermined time period from image reading apparatus 32 (YES at step 208 shown in FIG. 8), terminal 34 determines whether or not the result of inquiry is a viewing permission signal (step 212 shown in FIG. 8).

If the result of inquiry is the viewing permission signal at step 212, terminal 34 displays the image in accordance with the result (step 216 shown in FIG. 8).

If the result of inquiry is not the viewing permission signal at step 212, terminal 34 determines whether there is an IP address that has not yet transmitted the viewing request, among the IP addresses added to the image data (step 214 shown in FIG. 8).

If there is an IP address that has not yet transmitted the viewing request at step 214, terminal 34 returns the control to step 210. If there is no IP address that has not transmitted the viewing request at step 214, terminal 34 presents a message rejecting display of the image data to the user (step 218 shown in FIG. 8).

<If Viewing Limiting Information of all Groups is "All Pages">

An operation when a user whose viewing limiting information of all groups is "all pages" in user information table 140 has the image reading apparatus 32 read the document will be described. In that case, image reading apparatus 32 performs the process steps 150 to 168 described above. Here, the result of determination at step 168 is YES.

Image reading apparatus 32 encrypts the image data and attaches it to an electronic mail, and transmits the electronic mail to the mail address input at the time of log-in as the destination (step 170 shown in FIG. 6).

Assume that terminal 34 receives the electronic mail. Further, assume that a user displays image 250 of the electronic mail on terminal 34, and clicks link 254. Then, terminal 34 activates the application for displaying the image, and immediately displays the image data attached to the electronic mail (step 220 shown in FIG. 8).

When the electronic mail transmitted by image reading apparatus 32 is received by image forming apparatus 38, the operation of image forming apparatus 38 when link 254 of image 250 of the electronic mail is clicked is the same as the operation of terminal 34 described above. When an image is displayed on image reading apparatus 32, it is possible for the user to perform an operation of instructing printing of the displayed image, to image forming apparatus 38. In response to the instruction, image forming apparatus 38 prints the image on a sheet of recording paper.

Effects of the Embodiment

As is apparent from the description above, image reading apparatus 32 in accordance with the present embodiment reads the document image and automatically adds the authentication requesting message to the image data. Since the message is added, the terminal that received the image data does not immediately execute the process of displaying the image data. Therefore, if the image data contains confidential matters, it is possible to prevent disclosure of the image data to a malicious party.

As a result, even if the read image data is huge, viewing of image data can efficiently be limited without necessitating troublesome work by the user.

Second Embodiment (Network Environment)

Figure 10:
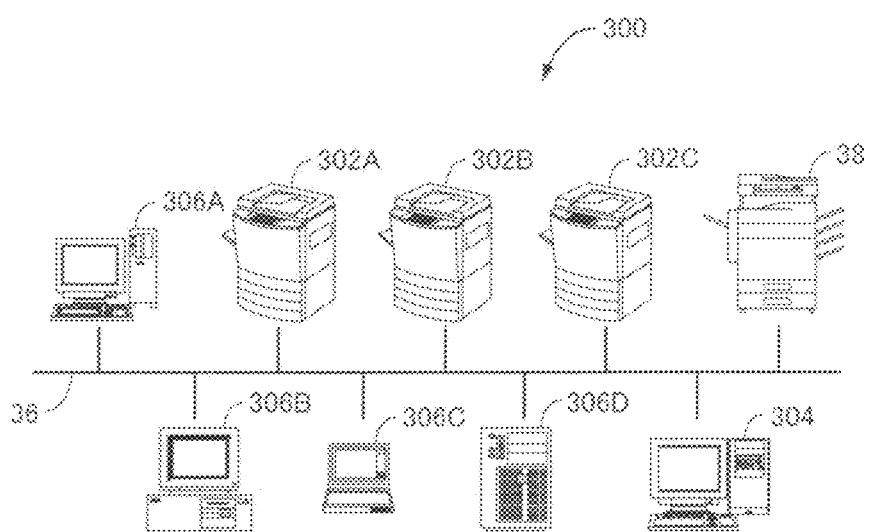
FIG. 10 shows an overall configuration of a network system 300 including an image reading apparatus 302 in accordance with a second embodiment of the present invention.

FIG. 10 is a schematic diagram showing an overall configuration of a network system 300 including an image reading apparatus 302A and the like, in accordance with a second embodiment of the present invention. Referring to FIG. 10, network system 300 is substantially the same as network system 30 in accordance with the first embodiment. Different from network system 30 in accordance with the first embodiment, however, it includes image reading apparatuses 302A to 302C and terminals 306A to 306D in place of image reading apparatuses 32A to 32C and terminals 34A to 34D, and it additionally includes a server 304.

In the following, image reading apparatuses 302A to 302C may be simply referred to as an image reading apparatus 302, and terminals 306A to 306D may be simply referred to as a terminal 306.

In the first embodiment, image reading apparatus 32 returns the result of inquiry to the viewing request transmitted from terminal 34 or image forming apparatus 38. In the present embodiment, server 304 performs the process of receiving the result of inquiry and returning the result of inquiry.

The internal configuration of terminal 306 in accordance with the present embodiment is substantially the same as the internal configuration shown in FIG. 2 of terminal 34 in accordance with the first embodiment, except that it includes, in place of viewing control unit 98, a viewing control unit for transmitting the viewing request to server 304 and receiving the result of inquiry from server 304.

The internal configuration of image reading apparatus 302 in accordance with the present embodiment is substantially the same as that of image reading apparatus 32 in accordance with the first embodiment, except that it does not include viewing permission notifying unit 136, and that it includes a storage not including user information table 140, in place of storage 126.

(Configuration of Server 304)

Figure 11:
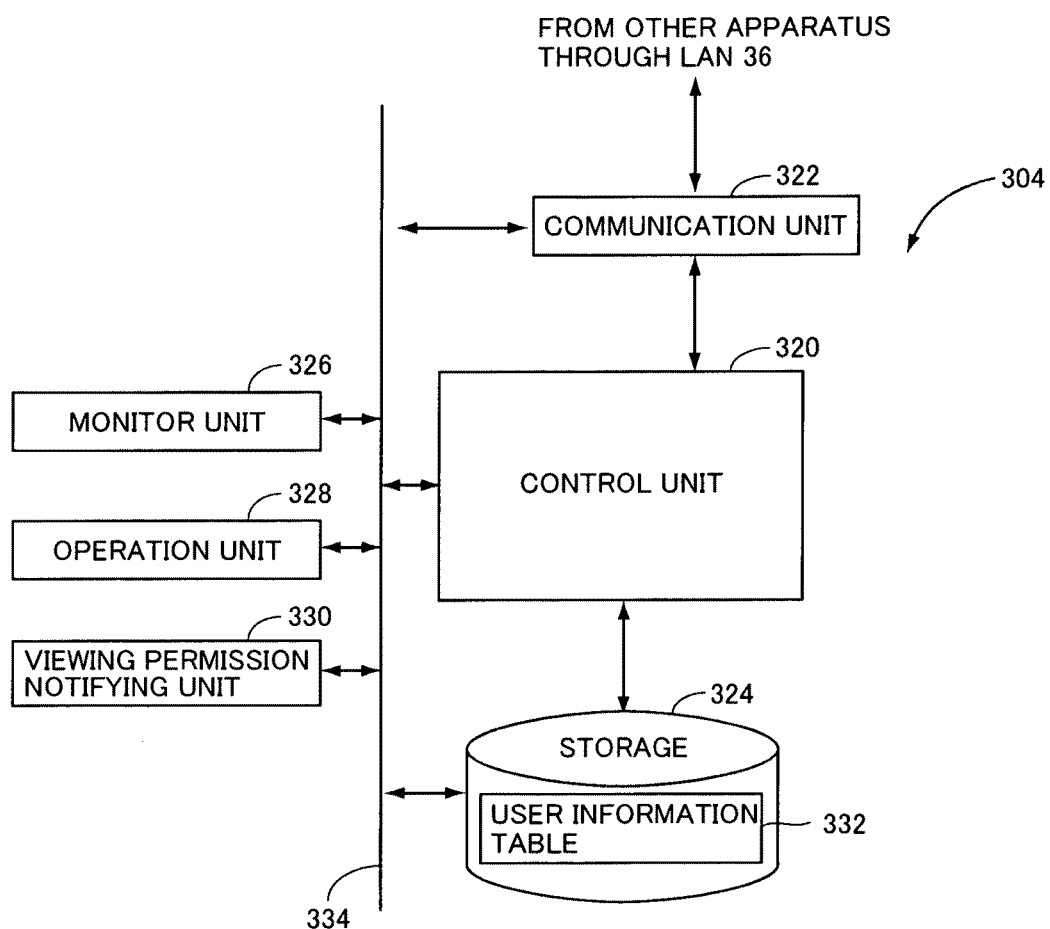
FIG. 11 is a block diagram showing a hardware configuration of a sever 304 shown in FIG. 10.

FIG. 11 is a block diagram showing an internal configuration of server 304. Referring to FIG. 11, server 304 includes: a monitor unit 326 such as a display; an operation unit 328 such as a mouse and a keyboard operated by the user; a communication unit 322 connected to LAN 36 for transmitting/receiving data to/from other apparatus through LAN 36; a storage 324 for storing various pieces of information including programs; and a viewing permission notifying unit 330 for returning, when a viewing request is received from terminal 306, a result of inquiry in response to the viewing request.

Storage 324 includes a user information table 332 having a configuration similar to that of user information table 140 in accordance with the first embodiment. User information table 140 in accordance with the first embodiment holds only the records of users permitted to use the image reading apparatus, for each image reading apparatus 32. User information table 332 in accordance with the present embodiment, however, has the record of every user permitted to use each of the image forming apparatuses 302 connected to LAN 36.

(Software Configuration)

The program executed by the control unit of image reading apparatus 302 when image reading apparatus 302 is activated is substantially the same as the program represented by the flowchart of FIG. 6. It is different, however, in that it includes, in place of step 152, a step of obtaining information stored in user information table 332 from server 304 and executing user authentication, and in place of step 168, a step of obtaining information stored in user information table 332 from server 304 and executing a determination process similar to that of step 168.

The flowchart representing a control structure of a program controlling viewing permission notifying unit 330, executed by control unit 320 of server 304 when server 304 receives a viewing request from terminal 306 is similar to the flowchart of FIG. 7.

FIG. 12 is a flowchart representing a control structure of a program controlling the viewing control unit executed by a control unit 50 of terminal 306, when image 250 shown in FIG. 9 is displayed on terminal 306 and link 254 is clicked by the user. Immediately before activation of the program, the user has input the name of the group to which he/she belongs, to terminal 306. Referring to FIG. 12, the program includes: a step 350 of activating an application for displaying an image; a step 352, following step 350, of determining whether or not an authentication requesting message is added to the image data and branching the control flow depending on the result of determination; a step 364, executed if the authentication requesting message is not added to the image data at step 352, of displaying the image data and ending the program; a step 354, executed if the authentication requesting message is added to the image data at step 352, of transmitting a viewing request including the group name of the user currently using terminal 306 and the user ID added to the image data, to server 304; and a step 356, following step 354, of waiting for reception of the result of inquiry to the viewing request, from server 304.

The program further includes: a step 358, executed when the result of inquiry is received at step 356, of determining whether it is a viewing permission signal, and branching the control flow depending on the result of determination; a step 360, executed if the result of inquiry at step 358 is the viewing permission signal, of displaying a page or pages in accordance with the signal, and ending the program; and a step 362, executed if the result of inquiry is not the viewing permission signal, of displaying to the user a message rejecting display of the image data, and ending the program.

(Operation)

Referring to FIGS. 10 to 12, network system 300 including image reading apparatus 302 in accordance with the present embodiment operates in the following manner.

The operation of image reading apparatus 302 reading an image of a document prepared by the user is substantially the same as the operation of image reading apparatus 32 in accordance with the first embodiment. The operation is different, however, in that it operates with reference to user information table 332 of server 304, in place of user information table 140.

After terminal 306 receives an electronic mail from image reading apparatus 32, the user has image 250 of the electronic mail displayed on terminal 306. Assume that the user clicks link 254.

Terminal 306 activates the application for displaying the image data attached to the electronic mail (step 350 shown in FIG. 12), and determines whether or not an authentication requesting message is added to the image data (step 352 shown in FIG. 12).

If the authentication requesting message is not added to the image data at step 352, terminal 306 immediately displays the image data (step 364 shown in FIG. 12).

If the authentication requesting message is added to the image data at step 352, terminal 306 transmits a viewing request to server 304 (step 354 shown in FIG. 12), and waits until a result of inquiry is received from server 304 (step 356 shown in FIG. 12). Receiving the result of inquiry from server 304, terminal 306 determines whether or not the result of inquiry is a viewing permission signal (step 358 shown in FIG. 12).

If the result of inquiry is the viewing permission signal at step 358, terminal 306 displays the image in accordance with the signal (step 360 shown in FIG. 12). If the result of inquiry is not the viewing permission signal at step 358, terminal 306 displays a message rejecting display of the image, to the user (step 362 shown in FIG. 12).

Effects of the Present Embodiment

According to the present embodiment, effects similar to those of the first embodiment are attained and, in addition, the result of inquiry permitting viewing of the image is transmitted by the server to the terminal. Therefore, as compared with the first embodiment, the load on image reading apparatus 302 can be reduced.

Modification

The image reading apparatus in accordance with the embodiment above is connected to other apparatuses through LAN. The present invention, however, is not limited to such embodiments, and it may be connected to other apparatuses through a virtual private network (VPN) formed on the Internet. VPN refers to a communication technique that enables communication of various apparatuses connected, for example, to the Internet, in the manner as if the apparatuses are connected through LAN. Generally, data transmission/reception on the Internet requires separate security setting in order to prevent leakage of data to the outside. Using VPN, however, such security setting becomes unnecessary for the user to transmit/receive data to other apparatuses. Since VPN is a well-known technique, how to set the communication method and the like will not be described here.

By using VPN, safe transmission/reception of image data becomes possible without necessitating separate security setting by the user, even when terminals and the image reading apparatus are connected on the Internet.

Assume, for example, that there are a plurality of offices of a company, and a viewing request has to be transmitted from a terminal placed at one office to an image reading apparatus placed at another office. In such a situation, generally, communication between the two offices is blocked off by the firewall provided at the offices. Using VPN, however, data transmission/reception between these offices becomes possible without such concern. Further, it is possible to execute the process of limiting viewing of image data communicated on a wide network, without necessitating troublesome work by the user to limit viewing.

Further, in the embodiments described above, the image reading apparatus asks the user to input the user ID and the password for user authentication. The present invention, however, is not limited to such embodiments. The user authentication may be done using biometrics, for example, by fingerprint authentication or voice authentication. Recently, techniques for user authentication using IC cards have been developed and, therefore, user authentication may utilize such techniques.

Further, in the embodiments above, "all pages" or "one page" is stored if viewing is permitted, as the viewing limiting information of the user information table. The present invention, however, is not limited to such embodiments. The number of pages that can be viewed may be set by the user as he/she chooses. For example, the user may set to allow viewing of 1 to 5 pages.

Further, in the embodiments above, the viewing limiting information represents which page of the document is to be viewed or represents prohibition of viewing. The present invention, however, is not limited to such embodiments, and the information may additionally include the number of permitted viewings or the expiration time of viewing permission. If the number of permitted viewings is exceeded or if the expiration time of viewing permission has passed when the viewing request is received from a terminal, a result of inquiry not permitting viewing may be returned to the terminal.

Further, in the embodiments above, the terminal and the image forming apparatus display image data when viewing permission signal is received. The present invention, however, is not limited to such embodiments. When link 254 shown in FIG. 9 is clicked, the terminal and the image forming apparatus may display a password input window to the user, asking input of a password. In that case, after the terminal and the image forming apparatus transmit the viewing request to the image reading apparatus, the image reading apparatus returns a viewing permission signal, with an automatically generated password added to the signal. Receiving the signal, the terminal and the image forming apparatus presents the password indicated by the signal, to the user. The terminal and the image forming apparatus may display the image data when the password indicated by the signal is input by the user through the password input window.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An image reading apparatus, including a document reading unit for reading a document image, using
    a storage for storing, for each user, user information of the user in association with viewing limiting information indicating whether or not viewing of the image data read by the document reading unit is limited in accordance with an instruction by the user;
    said image reading apparatus comprising:
        an authentication unit programmed to receive user information input by the user, and performing user authentication in accordance with whether or not the input user information is stored in said storage;
        a document reading control unit programmed to enable said document reading unit, when authentication by said authentication unit is successful; and
        an information adding unit programmed to respond to reading of document image data by said document reading unit, for adding to the image data, in accordance with the viewing limiting information stored in said storage in association with the user information input to said authentication unit, authentication requesting data indicating that authentication is required to view the image data, wherein
    the image reading apparatus is connected to another apparatus through a network, and
    said image reading apparatus further comprises:
        a data transmitting unit programmed to transmit the image data having the authentication requesting data added by said information adding unit, to said another apparatus through said network,
        a receiving unit programmed to receive a viewing request requesting viewing of the image data transmitted by said data transmitting unit, from said another apparatus through said network; and
        a permission signal transmitting unit, responsive to reception of the viewing request by said receiving unit, programmed to transmit a viewing permission signal indicating whether viewing is permitted or not, to the another apparatus as a source of transmission of the viewing request through the network.

2. The image reading apparatus according to claim 1, wherein
    the viewing limiting information stored in said storage includes group limiting information indicating whether or not viewing of image data read by said document reading unit is limited in accordance with an instruction by the user, for each of a plurality of groups;
    said data transmission unit further adds the user information input to said authentication unit to the image data and transmits the image data to said another apparatus through said network;
    the viewing request received by said receiving unit includes any of said groups and user information; and
    said permission signal transmitting unit transmits, responsive to reception of the viewing request by said receiving unit, a signal permitting viewing of the image data to the another apparatus as the source of transmission of the viewing request through said network, in accordance with the group limiting information stored in said storage in association with the group and user information included in the viewing request.

3. The image reading apparatus according to claim 2, wherein
    said document reading unit is capable of reading images of a plurality of document pages; and
    the group limiting information stored in said storage indicates a range of pages of the image data viewable by the group.

4. The image reading apparatus according to claim 1, wherein said data transmitting unit includes
    an encryption unit encrypting image data having an authentication requesting data added by said information adding unit, and
    an encrypted data transmitting unit transmitting the image data encrypted by the encrypting unit to said another apparatus through said network.

5. The image reading apparatus according to claim 1, wherein said another apparatus includes a communication apparatus.

6. The image reading apparatus according to claim 1, wherein said another apparatus includes an image forming apparatus.

* * * * *

UNITED STATES PATENT AND TRADEMARK OFFICE
CERTIFICATE OF CORRECTION

PATENT NO. : 8,896,861 B2  
APPLICATION NO. : 12/655436  
DATED : November 25, 2014  
INVENTOR(S) : Hamada Page 1 of 1

It is certified that error appears in the above-identified patent and that said Letters Patent is hereby corrected as shown below:

In the claims, Column 17 and 18 line 44-21, claim 1 delete the word "the" before the first instance of "image data", should read:

--1. An image reading apparatus, including a document reading unit for reading a document image, using a storage for storing, for each user, user information of the user in association with viewing limiting information indicating whether or not viewing of ~~the~~ image data read by the document reading unit is limited in accordance with an instruction by the user;
said image reading apparatus comprising:
an authentication unit programmed to receive user information input by the user, and performing user authentication in accordance with whether or not the input user information is stored in said storage;
a document reading control unit programmed to enable said document reading unit, when authentication by said authentication unit is successful; and an information adding unit programmed to respond to reading of document image data by said document reading unit, for adding to the image data, in accordance with the viewing limiting information stored in said storage in association with the user information input to said authentication unit, authentication requesting data indicating that authentication is required to view the image data, wherein the image reading apparatus is connected to another apparatus through a network, and
said image reading apparatus further comprises:
a data transmitting unit programmed to transmit the image data having the authentication requesting data added by said information adding unit, to said another apparatus through said network,
a receiving unit programmed to receive a viewing request requesting viewing of the image data transmitted by said data transmitting unit, from said another apparatus through said network; and
a permission signal transmitting unit, responsive to reception of the viewing request by said receiving unit,
programmed to transmit a viewing permission signal indicating whether viewing is permitted or not, to the another apparatus as a source of transmission of the viewing request through the network.--

Signed and Sealed this  
Twenty-sixth Day of January, 2016

Michelle K. Lee  
*Director of the United States Patent and Trademark Office*